(12) United States Patent
Ahmed

(10) Patent No.: US 7,246,108 B2
(45) Date of Patent: Jul. 17, 2007

(54) REUSING OPTIMIZED QUERY BLOCKS IN QUERY PROCESSING

(75) Inventor: Rafi Ahmed, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 502 days.

(21) Appl. No.: 10/901,272

(22) Filed: Jul. 27, 2004

(65) Prior Publication Data

US 2006/0026115 A1    Feb. 2, 2006

(51) Int. Cl.
G06F 17/00 (2006.01)
G06F 12/00 (2006.01)

(52) U.S. Cl. ............................... 707/2; 707/3; 707/101
(58) Field of Classification Search ............... 707/2, 707/3; 709/101
See application file for complete search history.

(56) References Cited

U.S. PATENT DOCUMENTS

| | | | | |
|---|---|---|---|---|
| 5,412,804 | A | * | 5/1995 | Krishna .................... 707/2 |
| 5,822,748 | A | | 10/1998 | Cohen et al. |
| 6,370,524 | B1 | * | 4/2002 | Witkowski .................. 707/3 |
| 2005/0234965 | A1 | * | 10/2005 | Rozenshtein et al. ....... 707/102 |
| 2005/0283471 | A1 | | 12/2005 | Ahmed |
| 2006/0026115 | A1 | | 2/2006 | Ahmed |

OTHER PUBLICATIONS

Armed et al.: "Cost-Based Query Transformation in Oracle", VLDB '06, Sep. 12-15, 2006, Seoul, Korea.*

George Lumpkin, Hakan Jakobsson, "Query Optimization in Oracle 9i", Oracle Corporation, Oracle White Paper, Feb. 2002, pp. 1-30.
Hamid Pirahesh, Joseph M. Hellerstein, Waqar Hasan, "Extensible/Rule Base Query Rewrite Optimization in Starburst", IBM Almaden Research Center, pp. 1-10.
Umeshwar Dayal, "Of Nests and Trees: A Unified Approach to Processing Queries That Contain Nested Subqueries, Aggregates and Quantifiers", Proceedings of the 13th VLDB Conference, Brighton 1987, pp. 197-208.
P. Griffiths Selinger, M.M. Astrahan, D.D. Chamberlin, R.A. Lorie, T.G. Price, "Access Path Selection in a Relational Database Management System", Proceedings of the 1979 ACM SIGMOD International Conference on the Management of Data, 1979, pp. 23-34.

* cited by examiner

Primary Examiner—John Cottingham
Assistant Examiner—Kuen S. Lu
(74) Attorney, Agent, or Firm—Hickman Palermo Truong & Becker LLP

(57) ABSTRACT

Techniques for reusing optimized query blocks in query processing are provided. The techniques include checking a data structure to determine whether a previously-generated query block information record corresponding to an already-processed first inner query block exists in the data structure, where the already-processed first inner query block corresponds to the first inner query block in a first state in an already-processed form. If the previously-generated query block information record exists in the data structure, then query block information is established for the first inner query block in the first state based on the previously-generated query block information record. Then a cost is determined for a semantically equivalent query that includes the first inner query block in the first state based on the query block information for the first inner query block in the first state.

42 Claims, 4 Drawing Sheets

| Query Block Identification | State | Query Block Type | Cost | Cardinality | Selectivity | Already-Optimized query block pointer. |
|---|---|---|---|---|---|---|
| | | | | | | |

210   220   230   240   250   260   270

REUSING OPTIMIZED QUERY BLOCKS IN QUERY PROCESSING

RELATED APPLICATIONS

This application is related to U.S. patent application Ser. No. 10/874,400, entitled "Multi-tier Query Processing", filed by Raft Ahmed on Jun. 22, 2004, the contents of which are herein incorporated by reference for all purposes as if originally set forth herein, referred to herein as to '2465.

This application is related to U.S. patent application Ser. No. 10/900,788, entitled "Determining Query Cost Based on a Subquery Filtering Factor", filed by Raft Ahmed on Jul. 27, 2004, the contents of which are herein incorporated by reference for all purposes as if originally set forth herein, referred to herein as to '2466.

This application is related to U.S. patent application Ser. No. 10/920,973, entitled "Selecting Candidate Queries", filed by Raft Ahmed on Aug. 17. 2004, the contents of which are herein incorporated by reference for all purposes as if originally set forth herein, referred to herein as to '2469.

FIELD OF THE INVENTION

The present invention relates to query processing. The invention more specifically relates to reusing optimized query blocks in query processing.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and submits updates to a database by interacting with a database application. The user's actions are converted into a query by the database application. The database application submits the query to a database server. The database server responds to the query by accessing the tables specified in the query to determine which information stored in the tables satisfies the queries. The information that satisfies the queries is retrieved by the database server and transmitted to the client application. Alternatively, a user may request information directly from the database server by constructing and submitting a query directly to the database server using a command line or graphical interface.

Queries submitted to the database server must conform to the rules of a particular query language. One popular query language, known as the Structured Query Language (SQL), provides users a variety of ways to specify information to be retrieved. In SQL and other query languages, queries may include inner query blocks. In SQL, every query has an outer query block and one or more inner query blocks. For example, the query

```
SELECT T1.x
FROM table1 T1, parts P
WHERE P.y = T1.y AND P.z = 'MED BOX'
    AND T1.quantity < (SELECT AVG (T2.quantity)
        FROM Table2 T2
        WHERE T2.partkey = P.partkey)
    AND P.quantity < (SELECT AVG (T3.quantity)
        FROM Table3 T3
        WHERE T3.serialnum = T1.serialnum);
``` has two inner query blocks, each of which is subqueries:

and

```
SELECT AVG (T2.quantity) FROM Table2 T2 WHERE
T2.partkey = P.partkey

SELECT AVG (T3.quantity) FROM Table3 T3 WHERE
T3.serialnum = T1.serialnum.
```

In some database systems, a query submitted by a user may be manipulated in order to determine a lower cost, semantically equivalent form of the query. The lower cost semantically equivalent version of the query is then executed in place of the original query. Since the lower cost query is semantically equivalent to the original query, the same results are produced. However, since the chosen semantically equivalent query has a lower cost than the original query, the same results are obtained with less computational cost than would have been incurred if the original query were executed.

In order to determine the lowest cost, semantically equivalent query, the costs for two or more semantically equivalent queries must be determined. In one approach to determining the costs, a set of candidate, semantically equivalent queries are determined and the costs for each of these queries are determined. The problem with this approach, however, is that determining the costs for each query is, in itself, a computationally expensive undertaking. In the example above, one or both of the subqueries may be nested (remain in the original form as above), unnested by merging these query blocks into the outer query, or unnested by generating inline views. Furthermore, if these inline views are mergeable, then they may be merged into the outer query block. Therefore, even in this simple case there will be up to eight different possible choices for alternative, semantically equivalent queries and therefore, determining the costs for the alternative queries may be prohibitively expensive.

Based on the discussion above, there is clearly a need for techniques that overcome the shortfalls of previous approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that depicts a table for storing query block information.

DETAILED DESCRIPTION OF THE INVENTION

Figure 1:
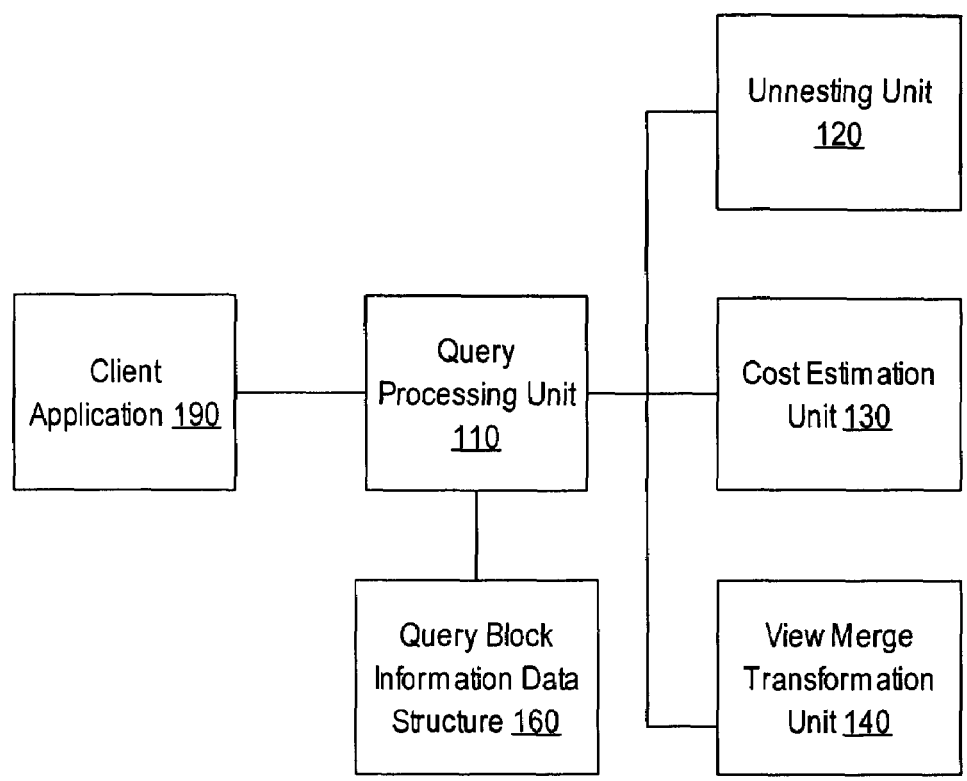
FIG. 1 is a block diagram that depicts a system for reusing optimized query blocks in query processing.

Techniques for reusing optimized query blocks in query processing are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Herein are described techniques for reusing optimized query blocks in query processing. In general, the techniques may include determining the costs for multiple semantically equivalent queries. The semantically equivalent queries each comprise the same query blocks and each of the query blocks may be in one of one or more states. An example of a query block in a particular state is a subquery being in an "unnested" state. Depending on implementation, subquery query blocks may be in one of three states: nested, unnested and merged, and unnested into a view. Depending on implementation, view query blocks may be in a state of being either unmerged or merged. The state of a query block may also be determined by pushing predicates. For example, a predicate may be pushed into a view. In general, the techniques described herein are not limited to any particular type of query block or any particular set of states for any particular type of query block.

When determining the cost for a particular semantically equivalent query, the state of each inner query block in the semantically equivalent query is determined and a query block information data structure is checked in order to determine whether there is stored query block information for that particular query block in that particular state. If there is already query block information for the particular query block in the particular state, then the already-processed (already-optimized) query block is retrieved and reused in the determination of the query block cost for the semantically equivalent query. If there is not already query block information for the particular query block in the particular state, then the query block information is determined and the newly-generated query block information is used to determine the cost of the semantically equivalent query. The newly-generated query block information may also be stored in the query block information data structure.

Estimating Query Cost

There are numerous methods for estimating the cost of a query. The techniques described herein are in no way limited to any particular type or types of estimation methods. Example techniques for estimating query costs are described in (1) "Access Path Selection in a Relational Database Management System" P. G. Selinger, et al., ACM SIGMOD, 1979; (2) "Database System Implementation", H. Garcia-Molina, et al., Prentice Hall, 2000; and (3) "Query Evaluation Techniques for Large Databases", G. Graefe, ACM Computing Surveys, 1993. Other examples of estimating query cost are described in '2465, '2466, and '2469.

Subquery Unnesting Transformation

Subquery unnesting may include determining a semantically equivalent version of a query in which the filtering of data produced by one or more subqueries within the query is effectively produced by introducing additional SQL join terms in the outer query. Generally, unnesting involves transformation in which (1) the subquery block is merged into the containing query block of the subquery or (2) the subquery is converted into an inline view. For example, some SQL IN or SQL ANY subqueries may be unnested by converting the subquery into an inline DISTINCT view or into an inline GROUP BY view. For a specific example, in the query listed in the section entitled Background, unnesting the subquery may result in:

```
SELECT L1.1_extendedprice
FROM lineitem L1, parts P,
  (SELECT AVG(L2.1_quantity) AS LAVG, L2.1_partkey AS L_PKEY
  FROM lineitem L2
  GROUP BY L2.1_partkey) V
WHERE P.p_partkey = L1.1_partkey AND P.p_container =
'MED BOX'
  AND P.p_partkey = V.L_PKEY AND and L1.1_quantity < V.LAVG;
```

The techniques described herein are in no way limited to any particular type or types of unnesting methods. Various embodiments of unnesting techniques are given in (1) "Of Nests and Trees: A Unified Approach to Processing Queries that Contain Nested Subqueries, Aggregates and Quantifiers", U. Dayal, 13th VLDB Conf. 1987; and (2) "Extensible/Rule Based Query Rewrite Optimization in Starburst", Pirahesh, et al., ACM SIGMOD, 1992.

View Merge Transformation

For queries that have had subqueries unnested, the unnesting process may result in the generation of a new inline view in the query. Depending upon the structure of a subquery and the technique or techniques used to unnest the subquery, it may produce a semi-joined, anti-joined or regular-joined inline views in the outer query. The original query may also reference inline or predefined views. These views in a query may be mergeable. In various embodiments, mergeable views may include those views that contain an aggregation function (e.g., MAX, MIN, COUNT, AVG, SUM), and, in the context of SQL, a SQL DISTINCT keyword, or a SQL GROUP BY clause. Other views may also be mergeable. The techniques described herein are in no way limited to any particular type or types of view merging. Example embodiments of view merging are given in (1) "Of Nests and Trees: A Unified Approach to Processing Queries that Contain Nested Subqueries, Aggregates and Quantifiers", U. Dayal, 13th VLDB Conf. 1987; and (2) "Extensible/Rule Based Query Rewrite Optimization in Starburst", Pirahesh, et al., ACM SIGMOD, 1992.

An example of merging a view, in the context of the example given above, is

```
SELECT L1.1_extendedprice
FROM lineitem L1, parts P, lineitem L2
WHERE L1.1partkey = P.p_partkey AND
  P.p_container = 'MED BOX'
  AND L2.1_partkey = P.p_partkey
GROUP BY L2.1_partkey, L1.1_quantity, L1.rowid, P.rowid,
  L1.1_extendedprice HAVING L1.1_quantity < AVG
  (L2.1_quantity).
```

Estimating Cardinality

The cardinality of a query or query block, in the context of a particular set of data, is the number of rows that remain after the query or query block is applied to the data. For example, if a query is executed on a database and the result is ten rows, then the cardinality of the query is ten rows.

As part of estimating the cost of queries, it may be necessary to estimate the cardinality of the query or of query blocks within the query. In general, estimating the cardinality of a query or query block depends on the query itself and certain statistical measures of the data on which the query is being executed. For example, when joining table T1 to table T2 for those rows in which T1.a=T2.b, the cardinality may be estimated as:

Cardinality(*T1* Join *T2* on *T1.a*=*T2.b*)=Cardinality(*T1*)\*Cardinality(*T2*)/MAX(*NDV*(*T1.a*), *NDV*(*T2.b*))

where Cardinality(T1) is the number of rows in T1, MAX(X, Y) represents the maximum of the two variables X and Y, and NDV(T1, a) represents the number of distinct values in column "a" in table T1.

The techniques described herein are in no way limited to a particular cardinality estimation technique. Other example methods of determining cardinality are described in H. Garcia-Molina, et al, "Database System Implementation", Prentice-Hall, 2000.

Predicate Manupulation

There are numerous types of predicate manipulation that may be performed on a query. The techniques described herein are in no way limited to any particular type or types of predicate manipulation. The example given here is for illustrative purposes only.

Predicates that are in a query may be "pushed" into one or more query blocks in the query. "Pushing" may be performed when a predicate in the outer query is independent of all other terms in the outer query. For example, consider the query:

```
SELECT View1.empno, View1.ename
  FROM ( SELECT empno, ename, job, mgr, hiredate, sal, comm, deptno
    FROM emp1
  UNION
  SELECT empno, ename, job, mgr, hiredate, sal, comm, deptno
    FROM emp2) View1
  WHERE View1.deptno = 20;
```

The predicate "View1.deptno=20" can be pushed into view "View1", resulting in the command:

```
SELECT empno, ename
  FROM ( SELECT empno, ename, job, mgr, hiredate, sal, comm, deptno
    FROM emp1
    WHERE deptno = 20
  UNION
  SELECT empno, ename, job, mgr, hiredate, sal, comm, deptno
    FROM emp2
    WHERE deptno = 20);
```

Other examples of predicate manipulation are given in J. Hellerstein, "Practical Predicate Placement", ACM SIGMOD, 1994.

Candidate Selection Techniques

When considering multiple semantically equivalent queries, a number of different candidate selection techniques may be used to determine for which queries, of all possible semantically equivalent queries, to determine costs. One such candidate selection technique is the "exhaustive selection" technique. In the exhaustive selection technique, all candidates that can be generated by the query processing unit 110 are selected for cost determination. Costs are determined for each of the semantically equivalent queries generated in the exhaustive selection technique, and, thereby, the semantically equivalent query with the overall lowest cost may be selected for storage and/or execution.

Other candidate selection techniques are "linear selection" technique and "iterative selection" technique, where fewer than all of the possible semantically equivalent queries are selected for cost determination. Linear and iterative selection techniques are described in more detail in '2469.

Structural Overview

FIG. 1 is a block diagram that depicts a system for reusing optimized query blocks in query processing.

FIG. 1 depicts five logical machines: a query processing unit 110, an unnesting unit 120, a cost estimation unit 130, a view merge transformation unit 140, and a client application 190. Each logical machine may run on separate physical computing machines or may be running on the same physical computing machine as one or more of the other logical machines. Various embodiments of computers and other physical and logical machines are described in detail below in the section entitled Hardware Overview. In one embodiment, the query block information data structure 160 is also a logical machine.

The query processing unit 110 is communicatively coupled to the unnesting unit 120, the cost estimation unit 130, the view merge transformation unit 140, a query block information data structure 160, and the client application 190. In various embodiments, each of the unnesting unit 120, cost estimation unit 130, the view merge transformation unit 140, and the query block information data structure 160, may also each be communicatively coupled to one or more of each of the other units or data structure 120, 130, 150, and 160. In various embodiments, coupling is accomplished by optical, infrared, or radio signal transmission, direct cabling, wireless networking, local area networks (LANs), wide area networks (WANs), wireless local area networks (WLANs), the Internet, or any appropriate communication mechanism.

In the example herein, the unnesting unit 120 provides, for a particular query that contains a subquery, an output query with the subquery unnested. The cost estimation unit 130 estimates the time or central processing unit (CPU) costs for an input query. The view merge transformation unit 140 takes as input a query with a mergeable view and merges the view to produce an output query. The query processing unit 110 may use one or more of the unnesting unit 120, the cost estimation unit 130, and the view merge transformation unit 140 to process queries that have one or more subqueries. The query processing unit 110 stores information related to an incoming query and its alternative, semantically equivalent forms to the query block information data structure 160. The query processing unit 110 also retrieves query block information from the query block information data structure 160.

In one embodiment, each of the query processing unit 110, the unnesting unit 120, the cost estimation unit 130, and the view merge transformation unit 140 runs as part of a database server. The database may be a single node or multiple node database server and may be an object-oriented database server, a relational database server, or any other structured data server.

The client application 190 may be a client program communicatively coupled to a database server comprising the query processing unit 110, the unnesting unit 120, the cost estimation unit 130, and the view merge transformation unit 140, or may be coupled directly to the query processing unit 110. In one embodiment, the client application 190 is a database application. The client application 190 may include machine executable instructions which, when executed by one or more processors, cause the application to transmit one or more queries to and receive results from the query processing unit 110.

Example Data Structure for Storing Query Block Information

FIG. 2 is a block diagram that depicts a table for storing query block information.

The query block information data structure 160 in FIG. 1 may include a table 200 as described with respect to FIG. 2. In various embodiments, the query block information data structure 160 also includes indices that can be used to search the query block information data structure 160. In one embodiment, the query block information data structure 160 includes a database table stored in a database having the form described with respect to table 200. In other embodiments, the query block information data structure 160 may be a hash table, a multidimensional array, or any appropriate data structure.

The query block information table 200 comprises a query block identification column 210, a state column 220, a query block type column 230, a cost column 240, a cardinality column 250, and a selectivity column 260, and the already optimized query block pointer column 270. In general, the values in each column 210–270 corresponds to values in each other column 210–270. The query block identification column 210 contains identifications, such as unique numbers or unique strings, that identify a particular query block. The state column 220 contains indications of the state of the query block. For example, a state value of "1" in the state column 220 may correspond to the query block being nested; and a state value of "2" may correspond to a subquery query block being unnested. The query block type column 230 contains values that indicate the "type" of query block. For example, a query block type value of "1" may be used when a query block is a view and a query block type value of "2" may be used when the query block is a subquery. The cost column 240 contains an indication of a cost for the query block. Cost estimates are discussed in the section entitled Estimating Query Cost. The values stored in the cost column 240 may be a cost per row value for the query block. The cardinality column 250 is only used when the query block is a view and contains a value that indicates the number of rows that are associated with the view in the query block. The selectivity column 260 is only populated when the query block type is a subquery and contains an estimation of the ratio of rows that will remain after application of the subquery. The already-optimized query block pointer column 270 may contain a memory pointer to the already-optimized query block in the state given in column 220. Examples of determining selectivities, such as subquery filtering factors, are described in '2466. Table 200 may also contain other columns and other values. For example, the table 200 may contain an additional column to store a pointer to an in-memory representation of the already-optimized query block corresponding to the query block identified in column 210. In one embodiment, the information contained in table 200 is stored within an in-memory representation of the already-optimized query blocks and the query block information data structure 160 includes one or more pointers to in-memory representations of already-optimized query blocks along with information that indicates which query block is pointed to by each pointer and what state the pointed-to query block is in. In this embodiment, information that would otherwise have been taken from table 200 is taken from the in-memory representations of the already-optimized query blocks.

Functional Overview

Figure 3:
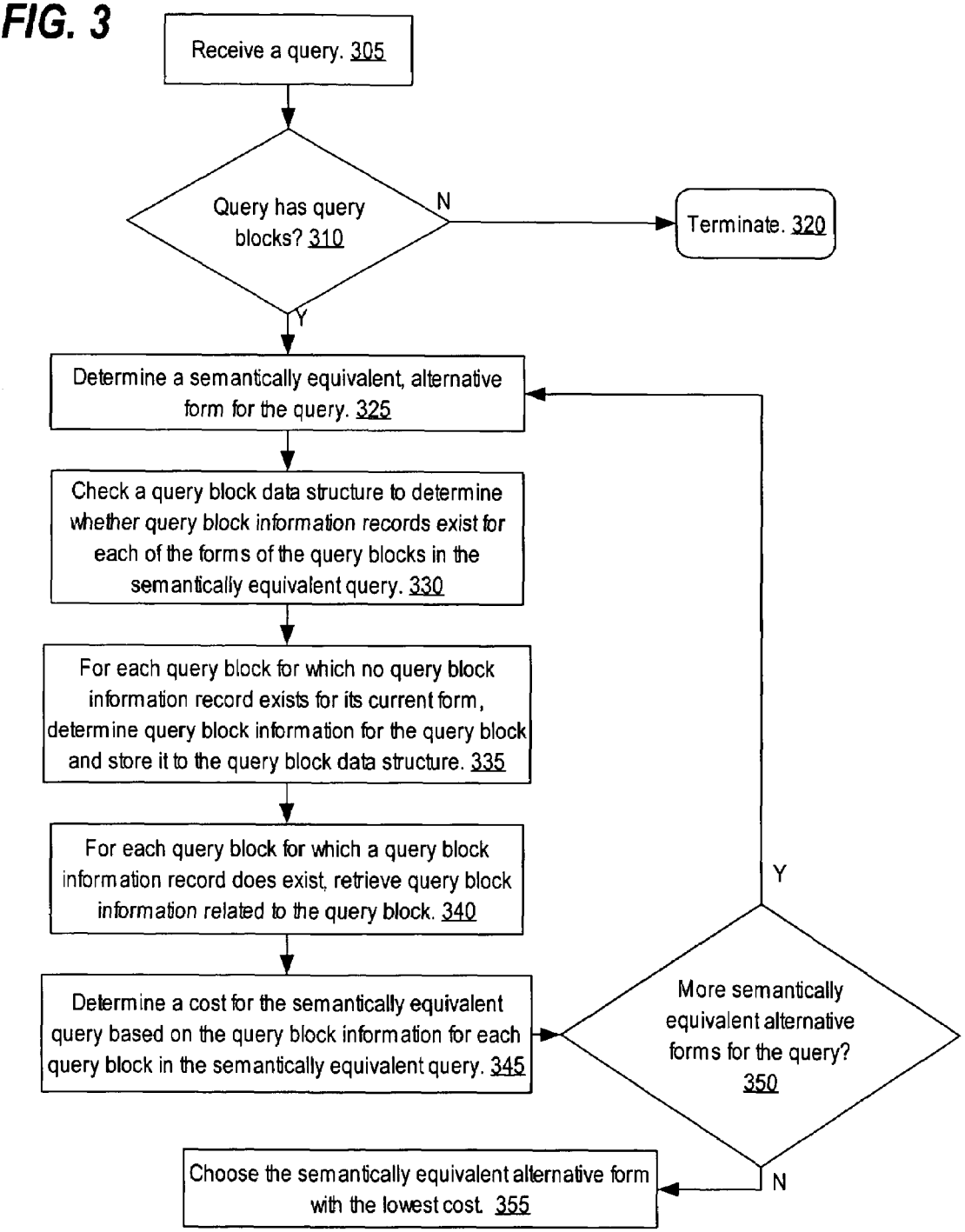
FIG. 3 is a flow diagram that depicts a process for reusing optimized query blocks in query processing.

FIG. 3 is a flow diagram that depicts a process for reusing optimized query blocks in query processing.

In step 305, the query processing unit 110 receives a query from a sender. The query may be received from any appropriate source. For example, a user may submit a query via operation of a client application 190 and the query processing unit 110 may receive the query from the client application 190. The user may be a human end user, a software unit, or a machine.

In step 310, a check is performed to determine whether the query has any inner query blocks; that is, views, subqueries, etc. This check may be performed by parsing the query. If the query has no inner query blocks, then in step 320, the process is terminated. Terminating the process depicted in FIG. 3 may comprise executing one or more other processes related to processing or executing the query.

If the query has two or more inner query blocks, then, in step 325, a "semantically equivalent query" that is semantically equivalent to the query received in step 305 is determined. Determining the semantically equivalent query may include performing transformations on one or more inner query blocks in the query. Query blocks that are subqueries may be unnested (see, e.g., the section entitled Unnesting Subqueries). Query blocks that are views may be merged (see, e.g., the section entitled View Merge Transformation). If the query contains a predicate, then the predicate may be "pushed into" a view query block in the query (see, e.g., the section entitled Predicate Manipulation). The "state" for each query block is determined based on which transformations are to be applied to the query block in the semantically equivalent query. For example, if a query block is a subquery and the subquery is going to be unnested, then a state corresponding to unnesting is determined for that query block.

The semantically equivalent query may be determined as part of a candidate query selection technique. In general, candidate query selection techniques provide sets of candidate, semantically equivalent queries. The cost for each of these candidate queries is determined; and the semantically equivalent query with the lowest cost is selected for storage and/or execution (see step 355). Example candidate query selection techniques, such as "exhaustive selection", "linear selection", and "iterative selection" are described in the section entitled Candidate Query Selection Techniques.

Once the state for each of the query blocks is determined in step 325, then, in step 330, a check is performed for each of the inner query blocks in the semantically equivalent query to determine whether query block information records exist in the query block information data structure 160 for the query blocks in its particular state. For example, in the context of FIG. 2, if a query block's identification number and state match corresponding values in the query block identification column 210 and the state column 220 in the table 200, then a matching query block information record for the query block in the particular state has been found and can be retrieved (step 340) and the already-optimized inner query block is attached to the query and used to determine the cost (step 345). If no such match is made then the query block information for the inner query block must be determined (step 335) before the cost for the query is determined (step 345).

In step 335, for each of the query blocks determined in step 330 for which no query block information exists (for its particular state) in the query block information data structure 160, query block information related to the query block is determined. For example, the query processing unit 110 may have the unnesting unit 120 and/or the view merge transformation unit 140 transform the query block into the appropriate state. The query processing unit 110 may then pass the transformed query block to the cost estimation unit 130. The cost estimation unit 130 will then return the query block information for the query blocks to the query processing unit 110. Example embodiments of determining costs and query block information are described in the section entitled Estimating Query Cost. In addition to costs, the cardinality of the query block, in the case of views, or the selectivity of query blocks, in the case of subqueries, may also be determined. Examples of determining cardinality are given in the section entitled Estimating Cardinality. Examples of determining selectivity for a query block are described in '2466.

The query block information determined in step 335 may be used in step 345 to determine the costs of the semantically equivalent query. In general, once the information related to the query blocks is determined, the information may be stored in the query block information data structure 160. For example the cost and selectivity for an unnested subquery query block are determined and this information is stored in an in-memory representation of the optimized query block, or in the table 200, along with the query block identification number, the state (e.g. "unnested"), the query block type (e.g. "subquery"), and a memory pointer to the already-optimized query block.

In step 340, the query processing unit 110 retrieves the query block information from the query block information data structure 160 for already-optimized query blocks (in their particular states) for which query block information is in the query block information data structure 160. The information may be retrieved in any appropriate manner including accessing a software library that returns the information in electronic format or by reading the information from the query block information data structure 160 stored on disk.

In step 345, a cost is determined for the semantically equivalent query based on the query block information for all of the inner query blocks in the semantically equivalent query. The query block information for each query block may have been determined in step 335 or retrieved in step 340. Example embodiments of determining the cost of a query are described above in the section entitled Estimating Query Cost. In the context of FIG. 2, the query processing unit 110 passes the semantically equivalent query and the query block information for the query blocks to the cost estimation unit 130. The cost estimation unit 130 determines the cost of the semantically equivalent query and returns the information to the query processing unit 110.

Once the cost is determined for the semantically equivalent query, then a check is performed in step 350 to determine whether there are more semantically equivalent queries to consider. This check may be performed as part of a candidate query selection technique as described above. If there are more semantically equivalent queries to consider, then step 325 is performed. If there are no more semantically equivalent queries to consider, then, in step 355, the semantically equivalent query with the lowest cost (as determined in step 345) is selected for storage and/or execution by the query processing unit 110. Since the choices of queries to execute are all semantically equivalent, the same end result would be produced by each semantically equivalent query upon execution. Since, in step 355, the semantically equivalent query with the lowest cost was chosen, the chosen query will efficiently produce the query results.

In one embodiment, the steps of FIG. 3 are performed for each "level" in a query in a bottom-up fashion. Consider the top-level query block (the outer query block) of the semantically equivalent query as level 0 query block. Consider the query blocks nested within the top-level query block of the semantically equivalent query as "level 1" query blocks. There may be "level 2" query blocks nested within the level 1 query blocks, etc. The techniques described herein may be first performed for the level N query blocks, then for the level N-1 query blocks, etc., and lastly for the top-level query block at level 0. This provides a bottom-up or a depth-first recursive approach and may allow an arbitrary number of levels of nested query blocks to be processed using the techniques described herein. The techniques described herein, however, are not limited to such an embodiment.

In one embodiment, a deep memory copying technique is used in determining the semantically equivalent queries. In the embodiment, the outer query is copied multiple times for generating each semantically equivalent query. Therefore, each semantically equivalent query has its own copy, in memory, of the query blocks being optimized. Each semantically equivalent query includes directives regarding each inner query block; that is, for example, an indicator of whether a particular query block will be unnested or not and whether a particular view will be merged or not.

In such an embodiment, already-optimized inner query blocks may be reused. That is, when a semantically equivalent query includes a particular inner query block in a particular state (e.g. a subquery in the unnested state), it may reuse that already-optimized inner query block in memory. The first time a query block is optimized in a particular state, the in-memory representation of the query block is carefully "detached" from its outer query and a pointer to this detached optimized query block is stored (for example, in query block information data structure 160 or in table 200). When, subsequently, other semantically equivalent queries that also include this inner query block in the same state are analyzed, the in-memory representation of the optimized query block may be "attached" to the subsequent, semantically equivalent query, possibly by replacing its un-optimized inner query block version. This embodiment may provide the benefit of enabling the use of the already-optimized extant query blocks to determine the cost of the semantically equivalent queries. That is, subsequent semantically equivalent queries will have the already-optimized query block attached in the correct place with correct state; these already-optimized query blocks will already contain information related to the cost, cardinality, selectivity, and/or other important information related to the inner query block. This obviates the necessity for re-optimizing the inner query block for the subsequent, semantically equivalent queries that may themselves contain multiple base tables and inner query blocks and therefore may be extremely expensive.

In the embodiments described with respect to FIG. 3, a certain order of steps was assumed. The techniques described herein are not limited to that order of steps. For example, in various embodiments step 340 is performed before step 335 or step 350 may be performed immediately after step 310.

In the embodiments described herein a particular system, depicted in FIG. 1, and query block information table 200 were used to make the description clearer. The techniques described herein, however, are neither limited to such a system nor to such a data structure. Any appropriate system may be used to perform the technique. Any data structure capable of storing and providing query block information for the query blocks may be used.

Various embodiments of the techniques described herein enable the determination of costs for queries without re-determining costs related to, and in some embodiments, in-memory representations of, individual inner query blocks in particular states. Multiple semantically equivalent queries may include a particular inner query block in the same particular state. The techniques described herein enable reuse of previously-generated query block information related to the already-optimized inner query block in the particular state when subsequent semantically equivalent queries include the inner query block in the same particular state. As such, the techniques described herein may provide more computationally efficient determination of costs for semantically-equivalent queries than do other approaches.

Hardware Overview

Figure 4:
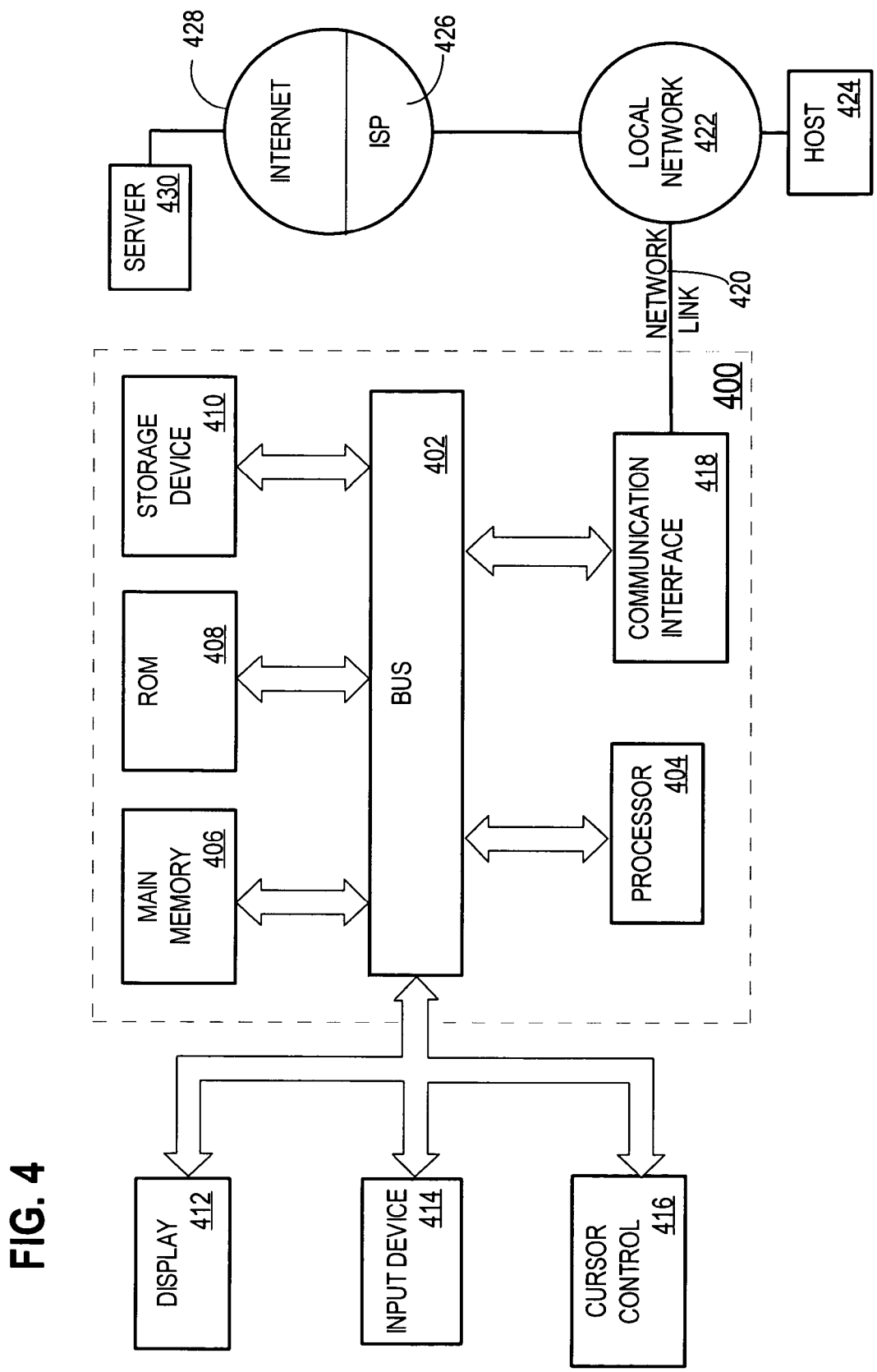
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP)

426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing a query that comprises an outer query and a first inner query block, comprising the machine-implemented steps of:
   checking a data structure to determine whether a previously-generated query block information record corresponding to an already-processed first inner query block exists in the data structure, wherein the already-processed first inner query block corresponds to the first inner query block in a first state in an already-processed form;
   if the previously-generated query block information record exists in the data structure, then establishing query block information for the first inner query block in the first state based on the previously-generated query block information record;
   if the previously-generated query block information record does not exist in the data structure, then generating and storing the query block information, for the first inner query block in the first state, in a newly-generated query block information record in the data structure; and
   based on the query block information for the first inner query block in the first state, determining a cost for a semantically equivalent query that includes the first inner query block in the first state;
   wherein the semantic equivalent query is one of a plurality of semantically equivalent queries for which costs are determined; and based on the costs, selecting and executing one of the plurality of semantically equivalent queries.

2. The method of claim 1, wherein the previously-generated query block information record comprises a memory pointer to a previously-generated, in-memory representation of the already-processed first inner query block; and wherein the step of determining the cost for the semantically equivalent query comprises:
   incorporating the previously-generated, in-memory representation of the already-processed first inner query block into an in-memory representation of the semantically equivalent query by using the memory pointer to the previously-generated in-memory representation of the already-processed first inner query block;
   determining the cost for the semantically equivalent query based on the in-memory representation of the semantically equivalent query, wherein the in-memory representation of the semantically equivalent query comprises the previously-generated in-memory representation of the already-processed first inner query block.

3. The method of claim 2, wherein the in-memory representation of the semantically equivalent query already includes an in-memory representation of the first inner query block in non-processed form; and
   wherein the step of incorporating comprises:
   replacing the in-memory representation of the first inner query block in non-processed form with the previously-generated, in-memory representation of the already-processed first inner query block.

4. The method of claim 1, further comprising the steps of:
   if the previously-generated query block information record does not exist in the data structure:
   processing the first inner query block in the first state to produce the already-processed first inner query block;
   determining a newly-generated query block information, wherein said newly-generated query block information is associated with the already-processed first inner query block; and
   establishing the query block information for the first inner query block in the first state based on said newly-generated query block information.

5. The method of claim 1, wherein the first inner query block is a subquery.

6. The method of claim 5, wherein the subquery in the first state comprises the subquery nested in the query.

7. The method of claim 5, wherein the subquery in the first state comprises the subquery unnested into an inline view in the query.

8. The method of claim 5, further comprising the step of generating the semantically equivalent query with the subquery in the first state, including:
   unnesting the subquery in the outer query, resulting in an inline view; and
   merging the inline view into the query.

9. The method of claim 1, wherein the first inner query block is a view.

10. The method of claim 9, wherein the view in the first state comprises the view unmerged in the query.

11. The method of claim 9, wherein the view in the first state comprises the view merged into the query.

12. The method of claim 9, wherein the view in the first state comprises a predicate from the outer query pushed into the view.

13. The method of claim 1, wherein the method further comprises the steps of:
   checking the data structure to determine whether a second previously-generated query block information record corresponding to a second already-processed first inner query block exists in the data structure, wherein the second already-processed first inner query block corresponds to the first inner query block in a second state in an already-processed form;
if the second previously-generated query block information record exists in the data structure, then:
establishing query block information for the first inner query block in the second state based on the second previously-generated query block information record.

14. The method of claim 13, further comprising the steps of:
if the second previously-generated query block information record does not exist in the data structure:
processing the first inner query block in the second state to produce the second already-processed first inner query block;
determining second newly-generated query block information associated with the second already-processed first inner query block; and
establishing the query block information for the first inner query block in the second state based on said second newly-generated query block information.

15. The method of claim 14, further comprising the steps of:
if the second previously-generated query block information record does not exist in the data structure, then:
storing said second newly-generated query block information in a second newly-generated query block information record in the data structure.

16. The method of claim 1, wherein the steps of claim 1 are performed for each semantically equivalent query of two or more queries that are semantically equivalent to the query; and wherein the step of selecting one of the plurality of semantically equivalent queries further comprises:
choosing, as a particular query, a semantically equivalent query with the lowest cost from among the two or more queries that are semantically equivalent to the query.

17. The method of claim 16, further comprising, after executing the particular query, providing the results of the executing step to a sender of the query.

18. The method of claim 16, wherein the two or more queries comprise all semantically equivalent queries that can be generated by a query-processing unit.

19. The method of claim 16, wherein the two or more queries comprise all candidate queries determined by a linear selection technique or an iterative selection technique.

20. The method of claim 1, wherein the first state is one of multiple, available states.

21. The method of claim 13, wherein each of the first state and the second state is one of multiple, available states; and wherein the first state is different from the second state.

22. A computer-readable storage medium carrying one or more sequences of instructions which, when executed by one or more processors, causes the one or more processors to perform the method recited in claim 1.

23. A computer-readable storage medium carrying one or more sequences of instructions which, when executed by one or more processors, causes the one or more processors to perform the method recited in claim 2.

24. A computer-readable storage medium carrying one or more sequences of instructions which, when executed by one or more processors, causes the one or more processors to perform the method recited in claim 3.

25. A computer-readable storage medium carrying one or more sequences of instructions which, when executed by one or more processors, causes the one or more processors to perform the method recited in claim 4.

26. A computer-readable storage medium carrying one or more sequences of instructions which, when executed by one or more processors, causes the one or more processors to perform the method recited in claim 5.

27. A computer-readable storage medium carrying one or more sequences of instructions which, when executed by one or more processors, causes the one or more processors to perform the method recited in claim 6.

28. A computer-readable storage medium carrying one or more sequences of instructions which, when executed by one or more processors, causes the one or more processors to perform the method recited in claim 7.

29. A computer-readable storage medium carrying one or more sequences of instructions which, when executed by one or more processors, causes the one or more processors to perform the method recited in claim 8.

30. A computer-readable storage medium carrying one or more sequences of instructions which, when executed by one or more processors, causes the one or more processors to perform the method recited in claim 9.

31. A computer-readable storage medium carrying one or more sequences of instructions which, when executed by one or more processors, causes the one or more processors to perform the method recited in claim 10.

32. A computer-readable storage medium carrying one or more sequences of instructions which, when executed by one or more processors, causes the one or more processors to perform the method recited in claim 11.

33. A computer-readable storage medium carrying one or more sequences of instructions which, when executed by one or more processors, causes the one or more processors to perform the method recited in claim 12.

34. A computer-readable storage medium carrying one or more sequences of instructions which, when executed by one or more processors, causes the one or more processors to perform the method recited in claim 13.

35. A computer-readable storage medium carrying one or more sequences of instructions which when executed by one or more processors, causes the one or more processors to perform the method recited in claim 14.

36. A computer-readable storage medium carrying one or more sequences of instructions which, when executed by one or more processors, causes the one or more processors to perform the method recited in claim 15.

37. A computer-readable storage medium carrying one or more sequences of instructions which, when executed by one or more processors, causes the one or more processors to perform the method recited in claim 16.

38. A computer-readable storage medium carrying one or more sequences of instructions which, when executed by one or more processors, causes the one or more processors to perform the method recited in claim 17.

39. A computer-readable storage medium carrying one or more sequences of instructions which, when executed by one or more processors, causes the one or more processors to perform the method recited in claim 18.

40. A computer-readable storage medium carrying one or more sequences of instructions which, when executed by one or more processors, causes the one or more processors to perform the method recited in claim 19.

41. A computer-readable storage medium carrying one or more sequences of instructions which, when executed by one or more processors, causes the one or more processors to perform the method recited in claim 20.

42. A computer-readable storage medium carrying one or more sequences of instructions which, when executed by one or more processors, causes the one or more processors to perform the method recited in claim 21.

* * * * *